United States Patent Office 3,507,859
Patented Apr. 21, 1970

3,507,859
HETEROCYCLIC QUATERNARY SALTS, SENSI-
TIZING DYES, AND PHOTOGRAPHIC EMUL-
SIONS MADE THEREFROM
Friedrich Bauriedel, Dreieichenhain, Werner Franke,
Wiesbaden, and Hilde Lang, Neu Isenburg, Germany,
assignors to E. I. du Pont de Nemours and Company,
Wilmington, Del., a corporation of Delaware
No Drawing. Filed Nov. 23, 1966, Ser. No. 596,471
Claims priority, application Germany, Jan. 20, 1966,
A 51,377
Int. Cl. C09b 23/00; G03c 1/28
U.S. Cl. 260—240.1
3 Claims

ABSTRACT OF THE DISCLOSURE

Thiazoline bases having an aryl substituent in the 5-position which serve as intermediates for the preparation of cyanine, carbocyanine, merocyanine, and related photographic sensitizing dyes and styryl dyes. The bases have the formula:

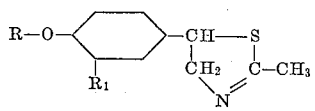

where R is alkyl or aryl and $R_1$ is H, alkyl or aryl. New dyes are disclosed. The cyanine dyes are useful in photographic color emulsions and cause no change in the sensitivity spectrum and no bathochromatic shift in the sensitivity maximum and preserve selective sensitization in the orthochromatic domain.

The present invention relates to a new heterocyclic quaternary salts containing a reactive methyl group to sensitizing dyes made therefrom and to spectrally sensitized photographic emulsions of silver halide containing the novel dyes.

It is well known that cyanine dyes, containing an unsubstituted thiazoline ring, are particularly useful for the selective, orthochromatic sensitization of silver halide emulsions in the short wave-length region. This results in the intensive sensitization and improved sensitivity particularly of silver chloride emulsions used in the manufacture of photographic papers and graphic arts films, this sensitization affecting the blue and the blue-green regions of the spectrum (cf. P. Glafkides, Photographic Chemistry, vol. II, p. 824). Photographic silver halide layers sensitized in this manner have a wide margin of dark room safety and extensive freedom from residual stain.

However, owing mainly to their tendency towards diffusion, thiazoline dyes derived from unsubstituted thiazoline rings are of little use in various other types of emulsions such as those containing coupling agents or other additives which impair the sensitization. In layers containing coupling agents, stabilizers, or other emulsion additives, these dyes are partly displaced from the grains, or the portion that is not directly adsorbed on the grains diffuses to the adjacent layers of emulsion or additives and causes unwanted sensitization in such layers.

It has now been found that dyes which contain at least one thiazoline ring substituted in the 5-position, of the general Formula I

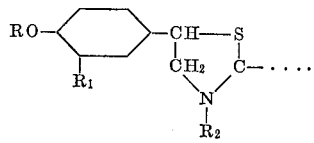

(where R is an alkyl or an aryl group and $R_1$ is an alkyl or an aryl group, or a hydrogen atom, and $R_2$ is an alkyl, carboxyalkyl or sulfoalkyl group) exert an outstanding and highly selective short-wavelength sensitization, which is superior to that of the well-known unsubstituted sensitizers of this type since they have a higher resistance to diffusion and they ensure a higher sensitivity. Suitable alkyl groups include methyl, ethyl and isopropyl and suitable aryl groups include phenyl and tolyl.

It is known that the tendency of cyanine dyes to diffuse to adjacent layers in photographic color films can be reduced by substitution by bulky unsaturated groups, e.g., phenyl groups. However, the introduction of substituents, particularly phenyl groups, for rendering the substance more stable to diffusion invariably causes an appreciable change in the original sensitivity spectrum generally causing a bathochromic shift in the sensitization maximum or in the long-wavelength limit of sensitization. This shift in the sensitization maximum or in the sensitization limit toward the longer wave-length region has a highly undesirable effect when a selective sensitization or greater darkroom safety is required. In other cases, in which bulky substituents are used for increasing the diffusion stability of sensitizers, both the color and the general sensitivity are reduced as compared to the sensitivity obtained with the unsubstituted dyes, or the contrast of the developed image is lower.

It was, therefore, surprising to find that the presence of bulky unsaturated substituents in the 5-position of the thiazoline nucleus of the cyanine dyes of the present invention causes practically no change in the sensitivity spectrum and particularly no bathochromic shift in the sensitivity maximum, enabling one instead to preserve fully the selective sensitization in the orthochromatic domain and the darkroom safety of the photographic material thus sensitized.

It was also surprising to find that the thiazoline dyes of the present invention, containing bulky aryl substituents in the 5-position, cause no reduction in the general and the color sensitivity of the photographic material sensitized in this manner, i.e. no reduction with respect to that achieved by unsubstituted thiazoline dyes, but often cause instead a better general and color sensitivity than that obtained with the known thiazoline dyes.

Thiazoline bases having an aryl substituent in the 5-position, which serve as intermediates in the manufacture of the dyes, correspond to the general Formula II

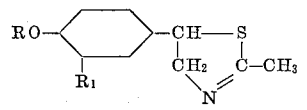

(where R is an alkyl or an aryl group and $R_1$ is an alkyl or an aryl group, or a hydrogen atom). These bases have so far been unknown, but can be prepared by a new and simple method from cheap and readily available starting materials, this method proceeding via the following steps and leading to good yields:

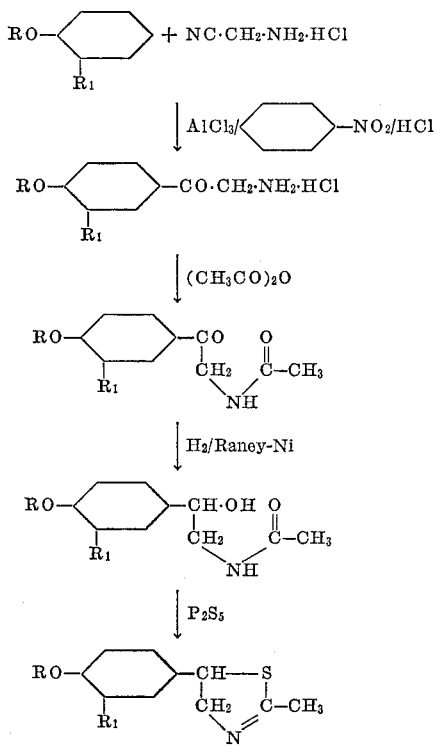

The bulky aryl groups introduced in this manner in the thiazoline ring in the 5-position and leading to an increase in the diffusion stability of the sensitizers are exemplified by the following groups: 4-methoxyphenyl, 4-ethoxy-phenyl, 4-phenoxyphenyl, 3,4-dimethoxyphenol, 3,4-diethoxyphenyl, 4-methoxydiphenyl, and 3-methyl-4-methoxyphenyl.

The substances of the present invention are also superior to dyes containing unsubstituted thiazoline rings in that the latter are very soluble, and therefore very difficult to isolate, as a result of which they can be obtained only in low yields.

The resulting new thiazoline bases can be converted into the reactive heterocyclic 2-methyl alkyl or aralkyl quaternary salts by methods commonly employed in the chemistry of cyanines, e.g. by reacting them with an alkyl or aralkyl salt forming compound, e.g., ethyl iodide or other alkyl halides, benzyl chloride, methyl or diethyl sulfate, ω-halocarboxylic acids, sultones and alkyl-p-toluene sulfonates, e.g., methyl or ethyl-p-toluene sulfonate.

The resulting heterocyclic quaternary salts of the invention may be represented by the formula:

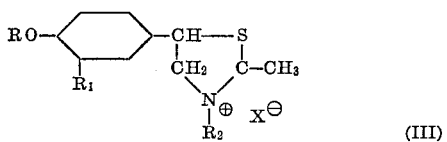

(where R is an aryl or an alkyl group, $R_1$ is an alkyl or an aryl group, or a hydrogen atom, $R_2$ is an alkyl, a carboxyalkyl, or a sulfoalkyl group, and $X^{\ominus}$ is an anion such as Cl, Br, I, $ClO_4$, and $SO_3C_6H_4CH_3$) can be converted into the required sensitizing dyes by the common processes, though the preferred route is via the alkaline condensation using strong tertiary bases, e.g., pyridine, piperidine, dialkylamines, etc.

Symmetrical trimethinecyanines containing the 5-aryl-substituted thiazoline ring of the present invention can be prepared, e.g., from the quaternary salts of the general Formula III, by reacting the latter in the well-known manner with orthoesters, e.g., triethyl orthoformate, triethyl orthoacetate, or triethyl orthopropionate in pyridine.

Unsymmetrical cyanine dyes are obtained by condensing the quaternary salts of the general Formula III with a cyclic ammonium salt of the general Formula IV

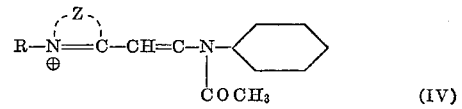

where R is an alkyl, a carboxyalkyl, or a sulfoalkyl group and Z is an atom needed for the closure of a five-membered ring. This condensation is carried out in pyridine or alcohol, in the presence of a tertiary amine such as triethylamine. The cyclic ammonium salts suitable for this reaction are exemplified by 2-β-acetanilidovinylbenzoxazole ethiodide, 2-β-acetanilidovinylbenzselenazole ethiodide, and 2-β-acetaniliodvinyl-β-napthothiazole ethiodide.

Merocyanines, containing according to the present invention at least one thiazoline ring carrying an aryl substituent in the 5-position have been found particularly suitable. They correspond to the general Formula V

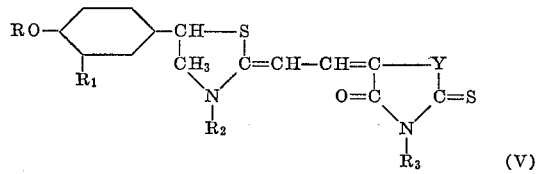

where Y is oxygen, sulfur, or an N-alkyl, or an N-aryl group, R is an alkyl or an aryl group, $R_1$ is an alkyl or an aryl group, or a hydrogen atom, $R_2$ is an alkyl, a carboxyalkyl, or a sulfoalkyl group, and $R_3$ is an alkyl group. These compounds can be prepared by the reaction of quaternary salts of the general Formula III with the β-acetovinyl derivatives of ketomethylene compounds represented by the general Formula VI

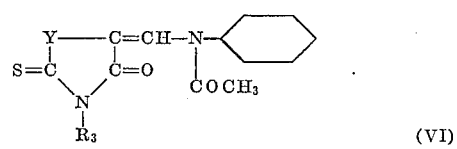

where Y and $R_3$ denote the same groups as in the general Formula V.

In Formulae (II)–(VI) inclusive, specific alkyl radicals have 1 to 4 carbon atoms and include methyl, ethyl, isopropyl and butyl. Specific aryl radicals are phenyl and tolyl.

Furthermore, polynuclear complex merocyanines can be prepared by quaternizing with alkylating agents the simple merocyanines of the general Formula V obtained from the quaternary salts of the general Formula III, this quaternization being followed by reacting the resulting merocyanine quaternary salts with reactive 2-methylcyclo-ammonium salts in the well-known manner. This method is also suitable for the preparation of, e.g., complex trinuclear merocyanines containing twice in the dye molecule the thiazoline ring carrying an aryl substituent in the 5-position, in accordance with the present invention. These compounds are also particularly suitable, and they correspond to the following general formula:

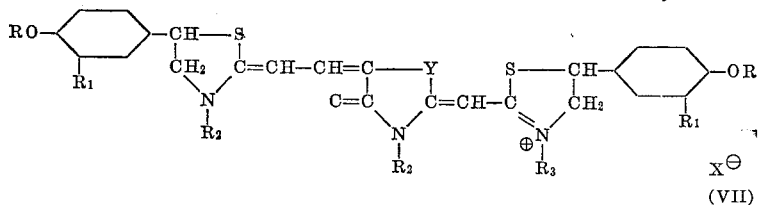
(VII)

where Y is oxygen, sulfur, or an N-alkyl, or an N-aryl group, R is an aryl or an alkyl group, $R_1$ is an alkyl or an aryl group, or a hydrogen atom, $R_2$ is an alkyl group, $R_3$ is an alkyl, carboxyalkyl, or sulfoalkyl group, and X is an anion such as Cl, Br, I, $ClO_4$, or $SO_3C_6H_4CH_3$. Suitable alkyl groups include methyl, ethyl and isopropyl and suitable aryl groups include phenyl and tolyl.

The styryl dyes, which, according to the present invention, contain at least one thiazoline ring carrying an aryl substituent in the 5-position, can be prepared by reacting the thiazoline quaternary salts of the general Formula III with aromatic aldehydes, particularly 4-dimethylaminobenzaldehyde, 4-dimethylaminonaphthaldehyde, or 4-di-($\beta$-hydroxyethyl)aminobenzaldehyde, in the presence of acid-binding condensing agents such as piperidine or triethylamine.

For the spectral sensitization of photographic emulsions, the thiazoline dyes of the present invention are added to the emulsion before coating, the actual manner of their introduction being simple and well-known to experts. The dyes are generally added in the form of a solution to the emulsions after the post-digestion and prior to coating, methanol being a suitable solvent in most cases. However, the addition of the sensitizers can also be carried out during the post-digestion of the emulsion.

The concentration of the dye in the emulsion can vary within wide limits depending on the required action. Thus, one may use about 5 to 100 mg. of sensitizer per kg. of the emulsion. However, the sensitizer concentration depends also on the type of the emulsion used. In the case of many sensitizers of the present invention, however, a very small amount (20 to 25 mg. per kg. of emulsion) of the sensitizer is sufficient for the optimal sensitization of silver halide emulsions. In the case of emulsions containing dye-coupling agents, on the other hand, optimum sensitization is reached only with a somewhat higher dye concentration, e.g., 40 to 80 mg. of dye per kg. of the cast emulsion.

Example 1

A sensitizer of Formula 1

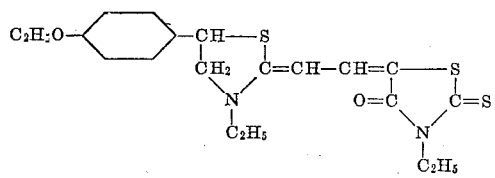

was added in an amount of 25 mg. per kg. of emulsion to a photographic emulsion of silver chloride containing 30 mole-percent of bromide. This resulted in a sensitization reaching from the sensitivity of the emulsion to about 595 m$\mu$, which showed a maximum at 560 m$\mu$ and a steep descent on the long-wavelength side of the sensitization domain. The material sensitized with this sensitizer exhibited a clearly higher general sensitivity than the material which was basically the same, but contained an analogous sensitizer instead of the sensitizer carrying a p-alkoxyphenyl substituent. On the other hand, the sensitivity maximum and the sensitivity limits were not different from those of the sensitizer carrying no p-alkoxyphenyl substituent.

The sensitizer used in this example was prepared by reacting 9.4 g. of 2-methyl-3-ethyl-5-(4-ethoxyphenyl)-Δ2,3- thiazolinium iodide with 7.7 g. of 5-acetanilidomethyl-3-ethylrhodanine in 25 ml. of water-free pyridine and 2.5 ml. of triethylamine. The reaction mixture was refluxed for 35 mm., cooled, and then poured onto 2 l. of a dilute solution of potassium iodide. An oily substance separated out at the bottom, and the supernatant liquid was decanted. The oily dye was again treated with methanol/KI solution, and separated out again. After this, it was repeatedly treated with hot methanol. As a result of these operations, the oily substance was converted into the solid form, and was then recrystallized to obtain it in the pure state. Yield 2.4 g., M.P. 163–165° C. (Decomp.), absorption maximum in methanol: 485 m$\mu$.

Example 2

A sensitizer of Formula 2

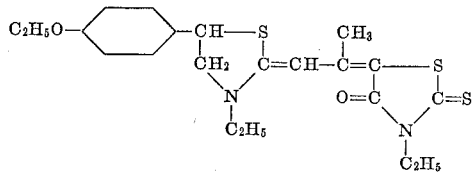

was added in an amount of 25 mg. per kg. of emulsion to a photographic emulsion of silver bromide and silver iodide containing 4 to 7 mole-percent of the iodide. This resulted in a sensitization reaching from the sensitivity of the emulsion to 590 m$\mu$ which showed a steep descent on the long-wavelength side of the sensitization domain. The material sensitized in this manner exhibited practically no residual coloration and a higher general sensitivity than the unsensitized materail.

The intermediate

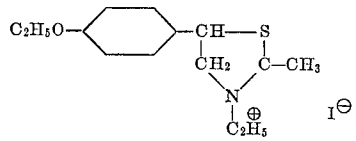

required for the preparation of the sensitizers used in Examples 1 and 2 was obtained in the following manner:

Step (a)—ω-Amino-4-ethoxyacetophenone hydrochloride

Powdered anhydrous aluminum trichloride (1230 g.) was introduced stepwise and with stirring into 2.7 l. of freshly distilled nitrobenzene. Care was taken to exclude all moisture. After complete dissolution of the aluminum trichloride, 460 g. of aminoacetonitrile hydrochloride were added stepwise and with stirring, the liberated reaction heat being educted by external cooling. To the resulting homogeneous solution were then added 605 g. of phenetole, and the mixture was stirred for 30 min. A stream of dry hydrogen chloride was passed for 8 hours into the deep-colored mixture. The reaction mixture was then poured, with energetic stirring, into water in such a manner that the hydrolysis temperature was 70° C. The solution was stirred until it reached room temperature. The crude aminoketone hydrochloride was filtered off at the pump, washed with acetone and ether, and recrystallized from methanol. Yield 295 g., M.P. 212° C.

Step (b)—ω-Acetylamino-4-ethoxyacetophenone

ω-Amino-4-ethoxyacetophenone hydrochloride (245 g.) prepared in step (a) was well ground with 150 g. of anhydrous sodium acetate, and the mixture was made to react by introducing it into a solution of 150 ml. of acetic anhydride in 245 ml. of glacial acetic acid. After being heated at 80° C. for 2 hours on oil bath (in the absence of moisture), the reaction mixture was poured into 4 l. of water. The solid precipitating out was filtered off at the pump and redissolved in chloroform. The chloroform solution was shaken with dilute HCl and washed with water. The solution was dried and the solvent evaporated giving the acetyl compound in the form of a white crystalline mass. After recrystallization the yield was 175 g., M.P. 138° C.

Step (c)—N-acetyl-2-(4-ethoxyphenyl)ethanolamine-1

Omega - acetylamine - 4 - ethoxyacetophenone (175 g.)

gether with steep fall of sensitivity at the long-wavelength side of the sensitivity domain. The developed, fixed, and dried material was found to be fully devoid of any residual coloration and exhibited a higher general and color sensitivity than the material prepared similarly, but with an analog instead of the merocyanine containing the thiazoline nucleus carrying a p-ethoxyphenyl residue in the 5-position. The sensitization region and the maximum did not differ from those of the analog.

Example 4

A sensitizer of Formula 4

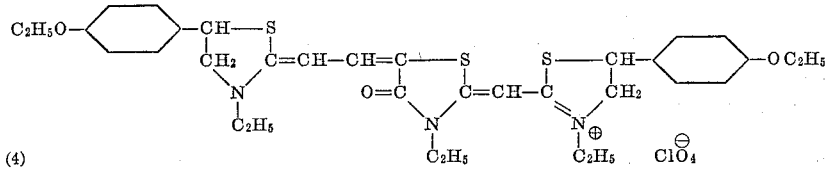

(4)

prepared in step (b) was dissolved in 1 l. of methanol and hydrogenated at 60° C. and 60 atm. with hydrogen and Raney nickel. The catalyst was removed and the methanol was distilled off giving 160 g. of N-acetyl-2-(4-ethoxyphenyl) ethanolamine-1 in the form of white crystals M.P. 95° C. The product could be used without further purification.

Step (d)—2-methyl-5-(4-ethoxyphenyl)thiazoline-Δ2

N-acetyl-2-(4-ethoxyphenyl)ethanolamine-1 (160 g.) prepared in step (c) was made to react with 37.5 g. of diphosphorous pentasulfide by heating of the mixture. After a homogeneous reaction mixture has been formed, the reactants were heated for 2 hours at 160° C. with stirring. When the reaction had reached completion, all the volatile products were removed by vacuum distillation at 185° C./1.5 mm. Hg. This gave 65 g. of a crude product, which was dissolved in ether and freed from acids over fused sodium hydroxide. A second fractionation under vacuum gave 45 g. of pure 2-methyl-5-(4-ethoxyphenyl)-thiazoline-Δ2 distilling over at 144–147° C./0.2 mm. Hg.

Step (f)—2-methyl-3-ethyl-5-(4-ethoxyphenyl) thiazolinium-Δ2 iodide

The thiazoline base (45 g.) prepared in step (d) was heated for 8 hours to 110° C. in a glass autoclave with 32 g. of ethyl iodide. After the quaternization had reached completion, the reaction mixture was cooled and the resulting solid product was triturated in acetone. Yield 56 g., M.P. 131–132° C. (decomp.).

In the case not described above, the preparation of the sensitizer dye of Examples 1 and 2 from the quaternary salt step (f) was carried out in accordance with the usual methods employed in the chemistry of cyanines.

Example 3

A sensitizer of Formula 3

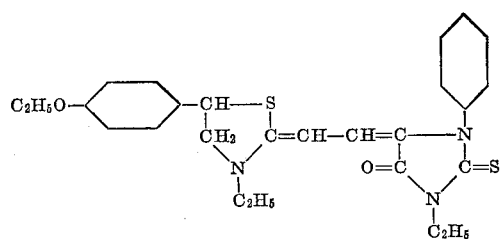

was added in an amount of 25 mg. per kg. of emulsion to a photographic emulsion of silver bromide and silver iodide containing 4–7 mole-percent of the emulsion to about 565 mμ and showing a maximum at 540 mμ towas added in an amount of 60 mg. per kg. of an emulsion of silver bromide and silver iodide containing 7 mole-percent of I and a pyrazolone derivative as a dye-coupling agent. This resulted in a green sensitization up to 595 mμ, showing a maximum at 575 mμ. This sensitization is suitable for the magenta layer.

The following process was used to prepare the sensitizer of Example 4, containing a trinuclear thiazoline nucleus carrying a p-ethoxyphenyl residue in the 5-position.

The merocyanine sensitizer (8.0 g.) of Example 1 was dissolved in 20 ml. of hot chlorobenzene. This was followed by the dropwise addition of 2.4 g. of dimethyl sulfate dissolved in 10 ml. of chlorobenzene and by refluxing of the mixture for 15 min. The reaction mixture was cooled, treated with ether, and allowed to stand for several hours. The supernatant liquid was decanted and 12.8 g. of an oily substance were obtained.

The volatile products were removed from the oil under vacuum, and the oil was dissolved in 40 ml. of dry pyridine, together with 7.3 g. of 2-methyl-3-ethyl-5-(4-ethoxyphenyl)-Δ2,3-thiazolinium iodide. This mixture was refluxed for 15 min. After the reaction had reached completion, the crude dye was precipitated from the reaction mixture with ether and freed from the unreacted merocyanine by repeated treatment with dimethylformamide and ether. It was finally obtained in the pure state by treatment of the dimethylformamide medium with a solution of sodium perchlorate. The dye exhibited in an alcoholic solution an absorption maximum at 537 mμ.

Example 5

A dye of the following formula

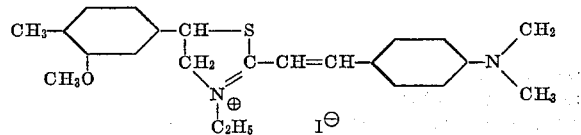

was prepared by refluxing for 20 min. 3.9 g. of 2-methyl-3-ethyl-5-(3,4-dimethoxyphenyl)-Δ2,3-thiazolinium iodide and 1.5 g. of 4-dimethylaminobenzaldehyde in 25 ml. of acetic anhydride. Cooling of the reaction mixture led to separation of the crude crystalline dye, which was filtered off, washed with ether, and recrystallized from methanol.

The resulting dye is soluble in water and can be bleached in photographic developing baths. Its absorption maximum (478 mμ) in an alcoholic solution does not differ from that of the dye carrying no aryl substituent in the 5-position. A method analogous to that used for the preparation of the 2-methyl-3-ethyl-5-(3,4-dimethoxyphenyl)-Δ2,3-thiazolinium iodide, the starting compound required for the preparation of a dye.

Example 6

A sensitizer of the following formula

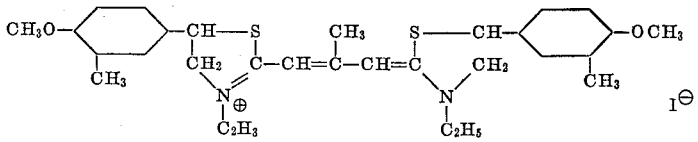

was obtained by reacting the reactive quaternary salt of the formula

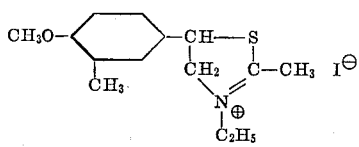

in the well-known manner with triethyl orthoacetate in a suitable solvent in the presence of triethylamine as a basic condensing agent. The above quaternary salt is prepared from o-cresol methyl ether and ω-aminoacetonitrile hydrochloride in a manner similar to that described in Example 1. The resulting dye was isolated and purified. It showed an absorption maximum at 465 mμ in an alcoholic solution.

This sensitizer was added in a quantity of 60 mg. per kg. of cast emulsion to a photographic emulsion of silver chloride and silver bromide containing 30 mole percent of bromide. This resulted in a sensitization reaching up to 540 mμ and showing a maximum at 495 mμ.

The embodiments of the invention in which an exclusive property or privilege is claimed are defined as follows:

1. A cyanine dye containing at least one thiazoline ring substituted in the 5-position selected from the dyes of the formulae:

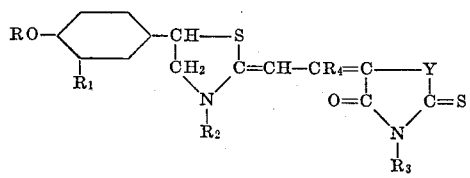

wherein
Y is oxygen, sulfur, N-alkyl of 1–4 carbons, phenyl or tolyl,
R is alkyl of 1–4 carbons, phenyl or tolyl,
$R_1$ is hydrogen or an alkyl of 1–4 carbons, phenyl or tolyl or alkoxy of 1–2 carbons,
$R_2$ is an alkyl of 1–4 carbons, carboxyalkyl, or sulfoalkyl of 1–3 carbons,
$R_3$ is an alkyl of 1–4 carbons, and
$R_4$ is hydrogen, methyl or ethyl;

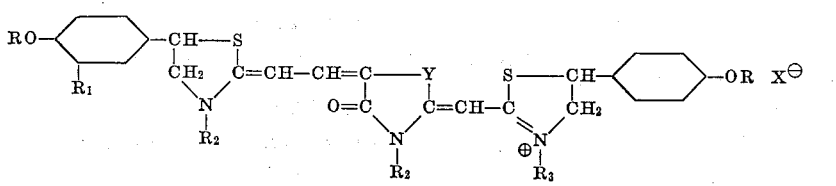

where
Y is oxygen, sulfur, N-alkyl of 1–4 carbons, phenyl or tolyl
R is alkyl of 1–4 carbons, phenyl or tolyl,
$R_1$ is hydrogen, alkyl of 1–4 carbons, phenyl or tolyl or alkoxy of 1–2 carbons,
$R_2$ is alkyl of 1–4 carbons,
$R_3$ is alkyl of 1–4 carbons, carboxyalkyl, or sulfoalkyl of 1–3 carbons, and
$x^-$ is a Cl, Br, I, ClO$_4$, or SO$_3$C$_6$H$_4$CH$_3$ anion;

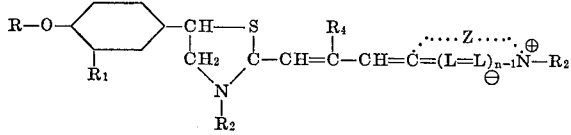

wherein R, $R_1$ and $R_2$ have the same values as in the two preceding formulae, and R' is 4-dimethylaminophenyl-, 4 - di - (beta - hydroxyethyl)aminophenyl- or 4 - dimethylaminonaphthyl-; and

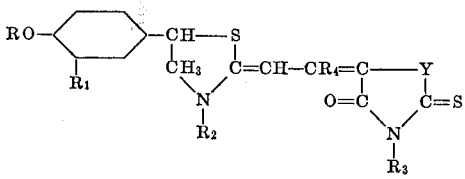

wherein R, $R_1$ and $R_2$ have the same values as in the preceeding formulae, $R_4$ in the case of symmetrical dyes is H, CH$_3$ or C$_2$H$_5$, and in the case of unsymmetrical dyes is H, L is a methine group, n is 0 or 1, $x^\ominus$ is a Cl, Br, I, ClO$_4$ or SO$_3$C$_6$H$_4$CH$_3$ anion, and Z is the atoms necessary to complete a benzoxazole benzothiazole, naphthiazole, benzselenazole nucleus or a nucleus of the formula

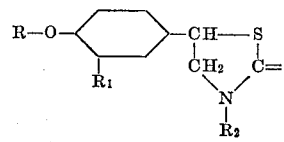

wherein R, $R_1$ and $R_2$ have the same values as in the preceeding formulae.

2. A merocyanine dye of the formula:

RO—⟨ ⟩—CH—S
     |    |
     R$_1$  CH$_3$  C=CH—CR$_4$=C——Y
              |         |        |
              N        O=C      C=S
              |                  |
              R$_2$              R$_3$ where
Y is oxygen, sulfur, N-alkyl of 1–4 carbons, phenyl or tolyl,
R is alkyl or 1–4 carbons, phenyl or tolyl, $R_1$ is hydrogen or an alkyl of 1–4 carbons, phenyl or tolyl,
$R_2$ is an alkyl of 1–4 carbons, carboxyalkyl, or sulfoalkyl of 1–3 carbons,
$R_3$ is an alkyl of 1–4 carbons, and
$R_4$ is hydrogen, methyl or ethyl.

3. A polynuclear complex merocyanine dye of the formula:

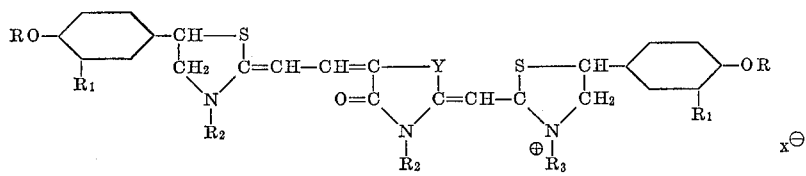

where

Y is oxygen, sulfur, N-alkyl or 1-4 carbons, phenyl or tolyl

R is an alkyl of 1-4 carbons, phenyl or tolyl, $R_1$ is hydrogen, alkyl of 1-4 carbons, phenyl or tolyl, $R_2$ is alkyl of 1-4 carbons, $R_3$ is alkyl of 1-4 carbons, carboxyalkyl, or sulfoalkyl of 1-3 carbons, and $x^{\ominus}$ is a Cl, Br, I, $ClO_4$, or $SO_3C_6H_4CH_3$ anion.

References Cited

UNITED STATES PATENTS 2,177,403  10/1939  Brooker _____ 260—240.4
2,186,624  1/1940   Brooker _____ 260—240.4

OTHER REFERENCES

Derwent Soviet Inventions Illustrated, Group 3, page 3 (May 1966), (abstract of Russion Patent 174,065).

JOHN D. RANDOLPH, Primary Examiner

U.S. Cl. X.R.

96—106; 260—240.4, 240.8, 240.9, 240.65, 306.7, 561, 570.5